United States Patent [19]

Roueche

[11] 3,718,640
[45] Feb. 27, 1973

[54] TRIAZOLE AZO PIGMENTS

[75] Inventor: Armand Roueche, Bottmingen, Switzerland

[73] Assignee: Ciba-Geigy AG, Basel, Switzerland

[22] Filed: April 22, 1970

[21] Appl. No.: 30,980

[30] Foreign Application Priority Data

May 7, 1969 Switzerland..........................7010/69

[52] U.S. Cl. ......................260/157, 106/22, 106/23, 106/228 Q, 117/123, 117/138.8 R, 117/138.8 B, 117/138.8 D, 117/138.8 E, 117/138.8 F, 260/140, 260/203, 260/204, 260/308 R

[51] Int. Cl......C09b 29/36, C09b 33/12, C09b 43/14

[58] Field of Search..............................260/157, 146

[56] References Cited

UNITED STATES PATENTS

| 2,848,447 | 8/1958 | Kracker et al.........................260/157 |
| 2,872,441 | 2/1959 | Kracker et al.........................260/157 |
| 3,124,565 | 3/1964 | Schilling et al........................260/157 |
| 3,498,966 | 3/1970 | Mueller................................260/157 |
| 2,838,486 | 6/1958 | Mueller et al.........................260/157 |

*Primary Examiner*—Floyd D. Higel
*Attorney*—Harry Goldsmith, Joseph G. Kolodny and Mario A. Monaco

[57] ABSTRACT

Azo pigments of the formula

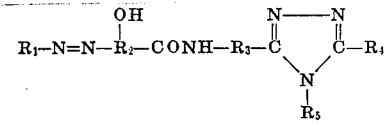

wherein $R_1$ denotes an aromatic radical, $R_4$ denotes a cyclic radical of aromatic character, $R_2$ denotes a naphthalene radical in which the azo, hydroxyl and —CO group are in the 1,2,3-position, $R_3$ denotes an arylene radical and $R_5$ denotes an alkyl or aryl group or a hydrogen atom, are useful for coloring plastics and lacquers in orange ro red shades of excellent fastness properties.

8 Claims, No Drawings

TRIAZOLE AZO PIGMENTS

This invention is based on the observation that new valuable azo pigments of the formula (1)
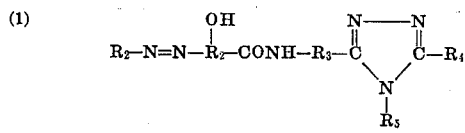

wherein $R_1$ denotes an aromatic radical, $R_4$ denotes a cyclic radical of aromatic character, $R_2$ denotes a naphthalene radical in which the azo, hydroxyl and —CO groups are in the 1,2,3-position, $R_3$ denotes an arylene radical and $R_5$ denotes an alkyl or aryl group or preferably a hydrogen atom, may be obtained a) by condensing a carboxylic acid halide of the formula (2)

with an amine of the formula (3)
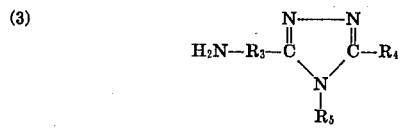

or b) a diazo or diazoamino compound of an aromatic amine is coupled with a coupling component of the formula (4)
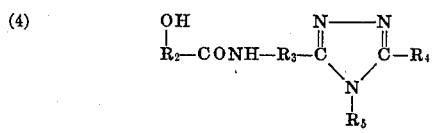

Since the products according to the invention are pigments, they do not contain groups which confer solubility in water, especially acid groups which confer solubility in water, for example sulphonic acid groups or carboxylic acid groups.

The carboxylic acids on which the halides required for embodiment (a) of the process according to the invention are based may be obtained by coupling a diazo compound of a carbocyclic or heterocyclic aromatic amine, especially an aminobenzene, with a 2,3-hydroxynaphthoic acid of the formula (5)
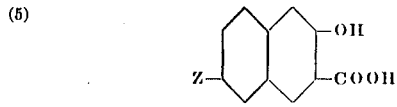

wherein Z denotes a hydrogen or halogen atom, or a nitro, cyano or alkoxy group.

Diazo components of particular interest are those of the formula (6)
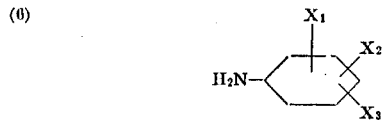

wherein $X_1$ denotes a hydrogen or halogen atom or an alkyl group, $X_2$ and $X_3$ each denotes a hydrogen or halogen atom, an alkyl, alkoxy, phenoxy, nitro, cyano, carboxylic acid ester, alkylsulphonyl, aralkylsulphonyl, trifluoromethyl, sulphonic acid amine or sulphonic acid ester group or a group of the formula —CONHR—, in which R denotes a hydrogen atom, an alkyl group or a phenyl group which may be substituted, for example by halogen atoms or alkyl, trifluoromethyl, alkoxy, nitro, cyano, carbalkoxy or alkanoylamino groups.

As examples of diazo components, the following amino-benzenes may be mentioned: 2-, 3- or 4-chloroaniline, 3,4-di-chloroaniline, 2,3-dichloroaniline, 2,4-dichloroaniline, 2,5-dichloroaniline, 2,6-dichloroaniline, 2,4,5-trichloroaniline, 2,4,6-trichloroaniline, 2-, 3- or 4-bromoaniline, 2,4-dibromoaniline, 2,5-dibromoaniline, 2-methyl-5-chloroaniline, 2-methyl-4-chloroaniline, 2-methyl-3-chloroaniline, 2-chloro-5-trifluoromethylaniline, 2-, 3- or 4-nitroaniline, 4-chloro-2-nitroaniline, 2-chloro-4-nitroaniline, 2-nitro-4-trifluoro-methylaniline, 4-nitro-2-trifluoromethylaniline, 3,5-di-(tri-fluoromethyl)-aniline, 3-trifluoromethylaniline, 4-methyl-3-nitroaniline, 2,4-dimethyl-3-nitroaniline, 2-methyl-5-nitro-aniline, 2-methyl-4-nitroaniline, 2- and 4-methoxyaniline, 2-methoxy-4-nitroaniline, 3-chloro-4-methoxyaniline, 2-methoxy-5-nitroaniline, 2-methoxy-5-chloroaniline, 2-methoxy-5-trifluoromethylaniline, 2-amino-4-trifluoromethyl-4'-chlorodiphenylether, 2-nitro-4-ethoxyaniline, 2-amino-4-chlorodiphenylether, 2-amino-2', 4-dichlorodiphenylether, 2-amino-4,4'-dichlorodiphenylether, 1-amino-2-carboxylic acid methyl ester, 1-amino-2-chloro-5-carboxylic acid methyl ester, 1-amino-2-chloro-5-carboxylic acid phenyl ester, 2-amino-5-nitrobenzoic acid methyl ester, 4-amino-3-nitro-benzotrifluoride, 2-amino-5-nitrobenzotrifluoride, 1-amino-2-methylbenzene-5-carboxylic acid methyl ester, 1-amino-2-methylbenzene-5-carboxylic acid phenyl ester, 1-amino-2-chlorobenzene-5-carboxylic acid methylamide, 2-amino-4-tri-fluoromethyldiphenylether, 4-methyl-3-aminobenzoic acid amide, 4-chloro-3-aminobenzoic acid amide, 2,4-dichloro-5-aminobenzoic acid amide, 4-methoxy-3-aminobenzoic acid amide, 4-methyl-3-aminobenzoic acid 2'-chloro-5'-trifluoromethyl-anilide, 4-chloro-3-aminobenzoic acid 2',5'-dichloroanilide, 4-chloro-3-aminobenzoic acid 2'-chloro-5'-carbomethoxyanilide, 4-chloro-3-aminobenzoic acid 3'-chloroanilide, 4-chloro-3-amino-benzoic acid 2'-chloro-5'-trifluoromethylanilide, 4-chloro-3-aminobenzoic acid 3'-trifluoromethylanilide, 4-chloro-3-aminobenzoic acid 3',5'-bis-(trifluoromethyl)-anilide, 4-chloro-3-aminobenzoic acid 2',4',5'-trichloroanilide, 2,4-dichloro-5-aminobenzoic acid 2',5'2,4-dichloro-5-amino-benzoic acid 2',4'-dichloroanilide, 2,4-dichloro-5-aminobenzoic acid 3'-trifluoromethylanilide, 2,4-dichloro-5-aminobenzoic acid 3'-chloroanilide, 5-amino-4-methoxy-2-chlorobenzoic acid 3'-trifluoromethylanilide, 4-methyl-3-aminobenzoic acid 2',5'-dichloroanilide, 4-methyl-3-aminobenzoic acid 3'-trifluoromethylanilide, 4-methoxy-3-aminobenzoic acid 3'-chloroanilide, 4-methoxy-3-aminobenzoic acid 2',5'-dichloroanilide, 4-methoxy-3-aminobenzoic acid 2',4', 5'-trichloroanilide, 4-carbomethoxy-3-aminobenzoic acid anilide, 4-methoxy-3-amino-benzoic acid 3'-trifluoromethylanilide, 4-carbethoxy-3-aminobenzoic acid 2',5'-dichloroanilide, 4-methoxy-3-amino-benzoic acid 3',5'-bis-(trifluoromethyl)-anilide, 4-methoxy-3-aminobenzoic acid 2'-chloro-5'-trifluoromethylanilide, 4-methoxy-3-aminobenzoic acid 2',5'-dimethoxy-4'-chloroanilide, 4-methoxy-3-aminobenzoic acid 2',5'-dimethyl-4''-chloroanilide, 4-aminobenzoic acid 2',4'-dichlorophenylamide, 4-amino-benzoic acid 2'-chloro-5'-trifluoromethylphenylamide, 4-amino-3-methyl-benzoic acid 3'-trifluoromethylphenylamide, 4-amino-3-methylbenzoic acid 4'-chlorophenylamide, 4-amino-3-nitrobenzoic acid 2',5'-dichlorophenylamide, 4-amino-3-methylbenzoic acid methyl ester, 4-amino-3-methylbenzoic acid phenyl ester, 4-methoxy-3-aminobenzoic acid phenyl ester and 4-methyl-3-aminobenzoic acid p-chlorophenyl ester.

The resulting azo dyestuff carboxylic acids are treated with agents which are capable of converting carboxylic acids into their acid halides, for example acid chlorides or bromides, especially with phosphorus halides, for example phosphorus pentabromide or phosphorus pentachloride to trichloride, phosphorus oxyhalides and preferably with thionyl chloride.

The treatment with such acid-halogenating agents is advantageously carried out in inert organic solvents, for example dimethylformamide, chlorobenzenes, for example mono-chlorobenzene or dichlorobenzene, toluene, xylene or nitro-benzene; the five last-mentioned compounds may be used together with dimethylformamide. When manufacturing the carboxylic acid halides it is as a rule desirable first to dry the azo compounds made in an aqueous medium or to free them from water by azeotropic distillation in an organic solvent. This azeotropic drying can, if desired, be carried out immediately prior to the treatment with the acid-halogenating agents.

The resulting azo dyestuff carboxylic acid chlorides are condensed with amines of formula (3), preferably with a monoamine of the formula (7)
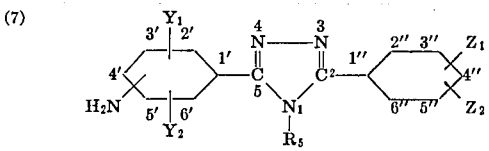

and especially with a monoamine of the formula (8)
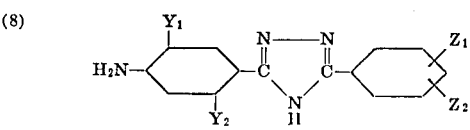

The azo dyestuff carboxylic acid chlorides can also be condensed in a molar ratio of 2:1 with diamines of the formula (9)
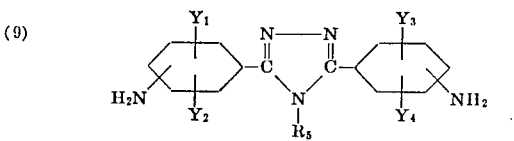

especially with those of the formula

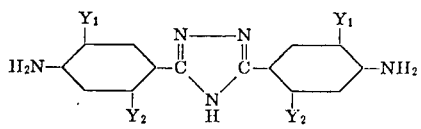

wherein $Y_1$, $Y_2$, $Y_3$ and $Y_4$ each denotes a hydrogen or halogen atom or an alkyl group, $Z_1$ and $Z_2$ each denotes a hydrogen or halogen atom, or an alkyl, alkoxy, trifluoromethyl or carbalkoxy group, and $R_5$ denotes a hydrogen atom or an alkyl or aryl group.

The following amines may be mentioned as examples: 4'-amino-2,5-diphenyl-1,3,4-triazole, 4'-amino-3'-methyl-2,5-diphenyl-1,3,4-triazole, 4'-amino-3',4''-dimethyl-2,5-diphenyl-1,3,4-triazole, 4'-amino-3'-methyl-2''-chloro-2,5-diphenyl-1,3,4-triazole, 4'-amino-3'-methyl-4''-chloro-2,5-diphenyl-1,3,4-triazole, 4'-amino-2'-chloro-2,5-diphenyl-1,3,4-triazole, 4'-amino-2',2'',4''-trichloro-2,5-diphenyl-1,3,4-triazole, 4'-amino-4''-methyl-2,5-diphenyl-1,3,4-triazole, 4'-amino-4''-chloro-2,5-diphenyl-1,3,4-triazole, 4'-amino-4''-methoxy-2,5-diphenyl-1,3,4-triazole, 4'-amino-3''-methyl-2,5-diphenyl-1,3,4-triazole, 4'-amino-4''-carbomethoxy-2,5-diphenyl-1,3,4-triazole, 3'-amino-6'-chloro-2,5-diphenyl-1,3,4-triazole, 2-(4'-aminophenyl)-5-(2''-furyl)-1,3,4-triazole, 2-(4'-aminophenyl)-5-α-naphthyl-1,3,4-triazole, 4',4''A-diamino-2,5-diphenyl-1,3,4-triazole, 4',4''-diamino-3',3''-dimethyl- 2,5-diphenyl-1,3,4-triazole, 4',4''A-diamino-3'-methyl-2,5-diphenyl-1,3,4-triazole, 4'-(p-aminophenyl)-2,5-diphenyl-1,3,4-triazole, and 4', 4''A-bis-(p-aminophenyl)-2,5-diphenyl-1,3,4-triazole.

The condensation of the aforesaid carboxylic acid halides and the amines is preferably carried out in an anhydrous medium. Under these conditions it generally takes place surprisingly easily at temperatures within the boiling range of the common organic solvents for example toluene, monochlorobenzene, dichlorobenzene, trichlorobenzene, nitrobenzene and the like. In order to accelerate the reaction it is generally advisable to use an acid-binding agent, for example anhydrous sodium acetate or pyridine. The resulting dyestuffs are in part crystalline and in part amorphous and are in most cases obtained in very good yield and in the pure state. It is advisable first to separate the acid chlorides obtained from the carboxylic acids. In some cases, however, the separation of the acid chlorides can be dispensed with without harm, and the condensation carried out immediately following the manufacture of the carboxylic acid chlorides.

According to the embodiment b) of the process according to the invention the new dyestuffs may be obtained by diazotizing an aromatic amine, preferably an aminobenzene, especially one of formula (6), and coupling with a coupling component of formula (4).

The coupling components can be obtained by condensation of a 2,3-hydroxynaphthoic acid chloride with an amine of formula (3), especially an amine of formula (7).

The coupling takes place by gradual addition of an aqueous alkaline solution of the coupling component to an acid solution of the diazonium salt. The coupling is advantageously carried out at a pH value of 4 to 6. The pH value is advantageously adjusted by adding a buffer. Suitable buffers are for example the salts, especially the alkali metal salts, of formic acid, phosphoric acid or especially acetic acid. The alkaline solution of the coupling component advantageously contains a wetting agent, dispersing agent or emulsifier, for example an aralkyl sulphonate, for example dodecylbenzene sulphonate or the sodium salt of 1,1'-naphthylmethane sulphonic acid, polycondensation products of alkylene oxides, for example the product of the action of ethylene oxide on p-tert.-octylphenol, and also alkyl esters of sulphoricinoleates, for example n-butyl sulphoricinoleate. The dispersion of the coupling component can also advantageously contain protective colloids, for example methylcellulose, or minor amounts of inert organic solvents which are sparingly soluble or insoluble in water, for example optionally halogenated or nitrated aromatic hydrocarbons, for example benzene, toluene, xylene, chlorobenzene, dichlorobenzene or nitrobenzene, as well as aliphatic halogenated hydrocarbons, for example carbon tetrachloride or trichloroethylene, and also organic solvents which are miscible with water, for example acetone, methyl ethyl ketone, methanol, ethanol or isopropanol.

The coupling can also be advantageously carried out by continuously adding an acid solution of the diazonium salt to an alkaline solution of the coupling component in a mixing nozzle, whereby immediate coupling of the components takes place. The resulting dyestuff dispersion is continuously withdrawn from the mixing nozzle and the pigment is separated by filtration.

The aryldiazoamino compounds to be used according to embodiment b) of the process according to the invention may be obtained according to known methods by coupling an aryldiazonium salt with a primary amine or preferably with a secondary amine. The most diverse amines are suitable for this purpose, for example aliphatic amines, for example methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethane sulphonic acid, methylaminoethane sulphonic acid, guanylethane sulphonic acid, β-aminoethylsulphuric acid; alicyclic amines, for example cyclohexylamine, N-methylcyclohexylamine and dicyclohexylamine; aromatic amines, for example 4-aminobenzoic acid, sulphanilic acid, 4-sulpho-4-aminobenzoic acid, (4-sulphophenyl)-guanidine, 4-N-methylamino benzoic acid, 4-ethylamino benzoic acid, 1-aminonaphthalene-4-sulphonic acid and 1-aminonaphthalene-2,4-disulphonic acid; heterocyclic amines for example piperidine, morpholine, pyrrolidine and dihydroindole, and finally also sodium cyanamide or dicyandiamide.

As a rule, the resulting diazoamino compounds are sparingly soluble in cold water and can be separated from the reaction medium in a crystalline form, if desired, after salting out. In many cases the moist press cakes can be used for further reactions. In individual cases it is advantageous to dehydrate the diazoamino compounds by vacuum drying prior to the reaction.

The coupling of the diazoamino compound with the coupling component takes place in an organic solvent, for example chlorobenzene, o-dichlorobenzene, nitrobenzene, pyridine, ethylene glycol, ethylene glycol monoethyl ether or mono-methyl ether, dimethylformamide, formic acid or acetic acid. When using solvents which are miscible with water it is not necessary to use the diazoamino compounds in an anhydrous form, for example the filter cakes which are moist with water may be used.

The coupling is advantageously carried out under warm conditions, preferably at temperatures between 80° to 180° C., in an acid medium and in general takes place very rapidly and completely. When neutral solvents are used, the addition of and acid, for example hydrochloric acid, sulphuric acid, formic acid or acetic acid is of advantage. As a result of their insolubility, the resulting pigments can be isolated from the reaction mixture by filtration. An after-treatment with organic solvents, as is necessary with pigments obtained by aqueous coupling, is therefore not necessary in most cases.

The new dyestuffs are valuable pigments which can be used in a finely divided form for pigmenting high molecular organic material, for example cellulose ethers and cellulose esters, polyamides or polyurethanes or polyesters, acetylcellulose, nitrocellulose, natural or synthetic resins, for example polymerization resins or condensation resins, for example aminoplasts, especially urea-formaldehyde and melamine-formaldehyde resins, alkyd resins, phenoplasts, polycarbonates, polyolefines, for example polyethylene, polypropylene, polystyrene, polyvinyl chloride, polyacrylonitrile, polyacrylic acid esters, rubber, casein, silicone and silicone resins, individually or as mixtures. It is immaterial whether the high molecular compounds mentioned are in the form of plastic masses, melts or spinning solutions, lacquers or printing inks. Depending on the end use, it is advantageous to use the new pigments as toners or in the form of preparations.

The new pigments are distinguished by excellent fastness properties, especially fastness to light and migration. The good fastness to migration of the new azo pigments is surprising since they contain only one carboxylic acid group and according to Fuchs, supplement to Chimica 1968, page 159, at least two carboxylic acid amide groups are required to ensure good fastness to migration of an azo pigment.

In the examples which follow the parts denote parts by weight and the percentages denote percentages by weight, unless otherwise stated.

EXAMPLE 1

36.5 Parts of the dyestuff obtained by coupling diazotized 2,5-dichloroaniline with 2,3-hydroxynaphthoic acid are heated for 2 hours at 135° to 145° C. with 390 parts of o-dichloro-benzene, 16.5 parts of thionyl chloride and 2 parts of dimethyl-formamide whilst stirring, whereby all the material dissolves. After the reaction mixture has cooled, the uniformly crystalline azo dyestuff monocarboxylic acid chloride is isolated by filtration and washed with 400 parts of benzene and then with 200 parts of petroleum ether. After drying at 50° C. in vacuo, 29.5 parts of a red crystal powder are obtained.

9.2 Parts of the azo dyestuff monocarboxylic acid chloride thus obtained are stirred with 500 parts of dichlorobenzene and heated to 80° to 90° C. A warm solution of 5.8 parts of 4'-amino-2,5-diphenyl-1,3,4-triazole in 20 parts of dimethyl-formamide and 20 parts of o-dichlorobenzene is then added and the mixture is heated to 140° to 145° C. for 12 hours. The sparingly soluble pigment which precipitates in a finely crystalline form is filtered hot, washed with hot o-dichlorobenzene until the filtrate issues clear, then with cold methanol and finally with hot water. After drying at 80° C. in vacuo, 9.9 parts of a soft-grained powder are obtained, the powder being practically insoluble in the customary solvents. It dyes polyvinyl chloride films as well as lacquers red shades of excellent fastness to light, migration and overstripe bleeding.

The pigment corresponds to the formula

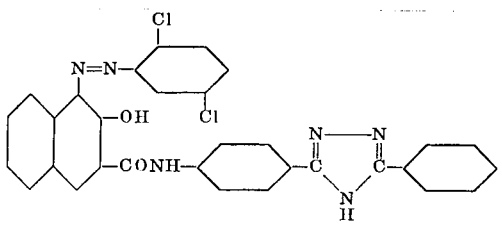

EXAMPLE 2

47.5 Parts of the dyestuff obtained by diazotizing 2,4,5-trichloroaniline with glacial acetic acid, hydrochloric acid and sodium nitrite and coupling with 2,3-hydroxynaphthoic acid, are mixed with 650 parts of o-dichlorobenzene, 20 parts of thionyl chloride and 2 parts of dimethylformamide and heated for two hours at 135° to 145° C. while stirring whereby all the material dissolves. When the reaction mixture has cooled, the uniformly crystalline monocarboxylic acid chloride of the dyestuff is isolated by filtration and washed with 400 parts of benzene and then with 200 parts of petroleum ether. After drying at 50° to 60° C. in vacuo, 39 parts of the dyestuff acid chloride are obtained as a red crystalline powder.

1.25 Parts of this acid chloride are stirred with 40 parts of o-dichlorobenzene and heated to 100° C. A warm solution of 0.8 part of 4'-amino-4''-methyl-2,5-diphenyl-1,3,4-triazole in 100 parts of o-dichlorobenzene is then added and the mixture heated to 140 to 145° C. for 12 hours. Thereafter the finely crystalline, sparingly soluble, pigment is filtered hot, washed with hot o-dichlorobenzene until the filtrate issues clear, then with cold methanol and finally with hot water. After drying at 80° to 85° C in vacuo, 1.4 parts of a soft powder are obtained which is practically insoluble in the customary solvents and which dyes polyvinyl chloride films as well as lacquers red shades having excellent fastness to light, migration and overstripe bleeding.

The pigment corresponds to the formula

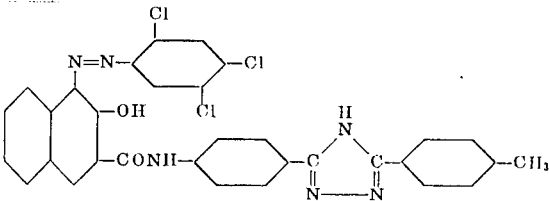

EXAMPLE 3

27.5 Parts of the dyestuff obtained by diazotizing 4-chloro-3-aminobenzoic acid (2'-chloro-5'-trifluoromethyl)-phenylamide with glacial acetic acid, hydrochloric acid and sodium nitrite and coupling with 2,3-hydroxynaphthoic acid, are mixed with 600 parts of chlorobenzene, 11.5 parts of thionyl chloride and 3.5 parts of dimethylformamide and heated for 10 hours at 55 to 60° C. whilst stirring. When the reaction mixture has cooled, the uniformly crystalline monocarboxylic acid chloride of the dyestuff is isolated by filtration, washed with cold benzene and dried at 50° C. in vacuo.

1.7 Parts of this acid chloride are stirred with 130 parts of o-dichlorobenzene and heated to 60° C. A warm solution of 0.75 part of 4'-amino-2,5-diphenyl-1,3,4-triazole in 4 parts of dimethylformamide is then added and the mixture heated at 140 to 145° C. for 12 hours. Thereafter the crystalline, sparingly soluble pigment is filtered hot, washed with hot o-dichlorobenzene, cold methanol and hot water, and dried in vacuo at 70° to 80° C. The resulting dyestuff of the formula

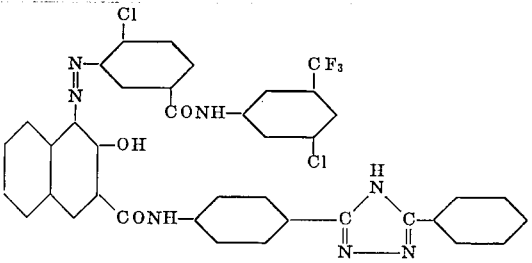

is a red pigment which is sparingly soluble to insoluble in the customary solvents and which dyes polyvinyl chloride films as well as lacquers excellent red shades which are fast to light, migration and overstripe bleeding.

The Table which follows gives further components from which monoazo pigments can be obtained in accordance with the process described in paragraph 1, when 1 mol of a diazo compound of the amines named in column I is coupled with 1 mol of the 2,3-hydroxynaphthoic acid named in column II, the resulting monoazo dyestuff carboxylic acid is converted into the acid chloride and condensed with 1 mol of the amine named in column III. Column IV indicates the color of a polyvinyl chloride film dyed with the resulting pigment.

| | I | II | III | IV |
|---|---|---|---|---|
| 1 | 2,5-dichloroaniline | 2,3-hydroxynaphthoic acid. | 4'-amino-4''-methyl-2,5-diphenyl-1,3,4-triazole. | Red. |
| 2 | do | do | 4'-amino-3',4''-dimethyl-2,5-diphenyl-1,3,4-triazole. | Brown. |
| 3 | do | 6-nitro-2,3-hydroxynaphthoic acid. | do | Red-orange. |
| 4 | do | 6-bromo-2,3-hydroxynaphthoic acid. | do | Red. |
| 5 | do | do | 4'-amino-2,5-diphenyl-1,3,4-triazole. | Red. |
| 6 | do | 6-methoxy-2,3-hydroxynaphthoic acid. | do | Claret. |
| 7 | do | do | 4'-amino-4''-methyl-2,5-diphenyl-1,3,4-triazole. | Do. |
| 8 | do | 2,3-hydroxynaphthoic acid. | 4'-amino-3'-methyl-2,5-diphenyl-1,3,4-triazole. | Orange. |

Table — Continued

| | I | II | III | IV |
|---|---|---|---|---|
| 9 | do | do | 4'-amino-2''-chloro-2,5-diphenyl-1,3,4-triazole | Brown. |
| 10 | 2-methoxy-4-nitroaniline | do | 4'-amino-4''-methyl-2,5-diphenyl-1,3,4-triazole | Claret. |
| 11 | do | do | 4'-amino-2,5-diphenyl-1,3,4-triazole | Scarlet. |
| 12 | 2,4,5-trichloroaniline | do | 4'-amino-3'-methyl-2,5-diphenyl-1,3,4-triazole | Red. |
| 13 | 2-chloro-5-trifluoromethylaniline | do | 4'-amino-2,5-diphenyl-1,3,4-triazole | Red. |
| 14 | do | do | 4'-amino-4''-methyl-2,5-diphenyl-1,3,4-triazole | Brown. |
| 15 | 3-amino-4-chlorobenzoic acid 2'-methyl-3'-chlorophenylamide | do | 4'-amino-2,5-diphenyl-1,3,4-triazole | Orange. |
| 16 | 3-amino-4-chlorobenzoic acid 3'-carbomethoxyphenylamide | do | do | Do. |
| 17 | do | do | 4'-amino-4''-methyl-2,5-diphenyl-1,3,4-triazole | Do. |
| 18 | 3-amino-4-chlorobenzoic acid 3'-trifluoromethylphenylamide | do | do | Do. |
| 19 | 3-amino-4-chlorobenzoic acid 2'-chloro-5'-trifluoromethylphenylamide | do | 3'-amino-6'-chloro-2,5-diphenyl-1,3,4-triazole | Do. |
| 20 | 3-amino-4-chlorobenzoic acid methyl ester | do | 4'-amino-4''-methyl-2,5-diphenyl-1,3,4-triazole | Brown. |
| 21 | 3-amino-4-chlorobenzoic acid phenylamide | do | 4'-amino-2,5-diphenyl-1,3,4-triazole | Scarlet. |
| 22 | 2-nitro-4-chloraniline | do | 4'-amino-4''-chloro-2,5-diphenyl-1,3,4-triazole | Brown. |
| 23 | 2,5-dichloraniline | do | do | Red. |
| 24 | 2,4,5-trichloroaniline | do | do | Red. |
| 25 | 2-chloro-5-trifluoromethylaniline | do | do | Red-orange. |
| 26 | 2-methoxy-5-chloroaniline | do | do | Bluish-tinged red. |
| 27 | 2-methoxy-4-nitroaniline | do | do | Claret. |
| 28 | 2-nitro-4-trifluoromethylaniline | do | do | Orange. |
| 29 | 2,5-dichloroaniline | 6-methoxy-2,3-hydroxynaphthoic acid | do | Claret. |
| 30 | 2-benzylsulphone-5-trifluoromethylaniline | 2,3-hydroxynaphthoic acid | do | Orange. |
| 31 | 4-chloro-3-aminobenzoic acid 3'-trifluoromethyl-anilide | do | do | Red-orange. |
| 32 | 4-chloro-3-aminobenzoic acid 2'-choloro-5'-trifluoromethylanilide | do | 4'-amino-3'-methyl-4''-chloro-2,5-diphenyl-1,3,4-triazole | Do. |
| 33 | 2,5-dichloroaniline | do | do | Brown. |
| 34 | 2,4,5-trichloroaniline | do | do | Do. |
| 35 | 2-chloro-5-carbomethoxyaniline | do | do | Red. |
| 36 | Anthranilic acid methyl ester | do | do | Red. |
| 37 | 2,5-dichloroaniline | do | 4'-amino-4''-methoxy-2,5-diphenyl-1,3,4-triazole | Red. |
| 38 | do | 6-bromo-2,3-hydroxynaphthoic acid | do | Red. |
| 39 | 2,4,5-trichloroaniline | 2,3-hydroxynaphthoic acid | do | Red. |
| 40 | 2-chloro-5-trifluoromethylaniline | do | do | Red. |
| 41 | 2,4,5-trichloroaniline | do | 4'-amino-2'',4''-dichloro-2,5-diphenyl-1,3,4-triazole | Brown. |
| 42 | 2-benzylsulphone-5-trifluoromethylaniline | do | do | Orange. |
| 43 | 2,5-dichloroaniline | do | 4'-amino-3'-methyl-2'',4''-dichloro-2,5-diphenyl-1,3,4-triazole | Brown. |
| 44 | 2,4,5-trichloroaniline | do | do | Do. |
| 45 | 2,5-dichloroaniline | do | 4'-amino-2'',5''-dichloro-2,5-diphenyl-1,3,4-triazole | Do. |
| 46 | Anthranilic acid methyl ester | do | do | Orange. |
| 47 | 2,5-dichloroaniline | do | 2-(4'-aminophenyl)-5-(2''-furyl)-1,3,4-triazole | Red. |
| 48 | 4-chloro-3-aminobenzoic acid 3'-trifluoromethylanilide | do | do | Red-orange. |
| 49 | 2,4,5-trichloroaniline | do | 2-(4'-aminophenyl)-5-α'-naphthyl-1,3,4-triazole | Red. |
| 50 | 2-benzylsulphone-5-trifluoromethylaniline | do | do | Orange. |
| 51 | Anthranilic acid methyl ester | do | 4'-amino-4''-carbomethoxy-2,5-diphenyl-1,3,4-triazole | Scarlet. |
| 52 | 2,4,5-trichloroaniline | do | do | Red. |
| 53 | 2,5-dichloroaniline | do | do | Red. |
| 54 | 4-ethoxy-3-aminobenzoic acid 3'-trifluoromethylanilide | do | 4'-amino-4''-chloro-2,5-diphenyl-1,3,4-triazole | Bluish-tinged red. |
| 55 | 4-methyl-3-aminobenzoic acid ethyl ester | do | do | Red. |
| 56 | 2,5-dichloroaniline | 6-nitro-2,3-hydroxynaphthoic acid | do | Red. |
| 57 | 2-ethylsulfone-5-trifluoromethylaniline | 2,3-hydroxynaphthaloic acid | do | Orange. |
| 58 | 3-amino-4-chlorobenzoic acid (4'-chloro) phenylester | do | do | Red. |
| 59 | 3-amino-4-chlorobenzenesulfonic acid-2',5'-dichlorophenylester | do | do | Red. |
| 60 | 3-amino-4-methylbenzenesulfonic acid-3'-trifluoromethylphenylamide | do | do | Red. |
| 61 | 3-amino-5-chlorobenzoic acid amide | do | 4'-amino-4''-carbomethoxy-2,5-diphenyl-1,3,4-triazole | Red. |
| 62 | 2-methoxy-4-chloroaniline | do | 4'-amino-4''-chloro-2,5-diphenyl-1,3,4-triazole | Red with bluish tinge. |
| 63 | 4-chloro-3-aminobenzoic acid 2'-methoxyanilide | do | do | Red. |
| 64 | 4-chloro-3-aminobenzoic acid methylamid | do | do | Red. |
| 65 | 4-phenoxy-3-amino-benzotrifluoride | do | do | Red. |
| 66 | 3-amino-4-chlorobenzoic acid phenylester | do | do | Red. |
| 67 | 4-chloro-3-aminobenzoic acid 3'-trifluoromethylanilide | do | 4'-amino-4''-trifluoromethyl-2,5-diphenyl-1,3,4-triazole | Red. |

EXAMPLE 4

3.9 Parts of the dyestuff acid chloride described in Example 1 are stirred with 180 parts of o-dichlorobenzene and heated to 80 to 85° C. A hot solution of 1.25 parts of 4',4''-diamino-2,5-diphenyl-1,3,4-triazole in 8 parts of dimethylformamide and 10 parts of o-dichlorobenzene is then added and the mixture is heated to 140° to 145° C. for 12 hours. Thereafter the finely crystalline, sparingly soluble pigment is filtered hot, washed with hot o-dichlorobenzene until the filtrate emerges colorless, then with cold methanol and finally with hot water. After drying at 80 to 85° C. in vacuo, 3.2 parts of a soft powder are obtained which is practically insoluble in the customary solvents and which dyes polyvinyl chloride films as well as lacquers excellent brown shades which are fast to light, migration and overstripe bleeding.

The pigment corresponds to the formula

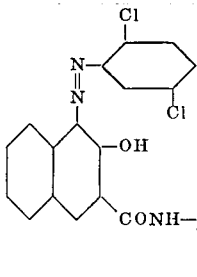

The Table which follows gives further components from which disazo pigments can be obtained in accordance with the process described in paragraph 1, when a diazo compound of the amine named in column I is coupled with the 2,3-hydroxynaphthoic acids named in column II, the resulting monoazo dyestuff carboxylic acid is converted into the acid chloride and 2 mols thereof are condensed with 1 mol of the diamine named in column III. Column IV indicates the color of a polyvinyl chloride film dyed with the resulting pigment.

is obtained in good yield. The properties of the pigment can be improved by after-treatment in an organic solvent, for example nitrobenzene. The pigment is sparingly soluble to insoluble in the customary solvents and dyes polyvinyl chloride film and lacquers red-orange shades of good fastness to migration overstripe bleeding and light.

EXAMPLE 6

2.0 Parts of the diazoamino compound of the formula

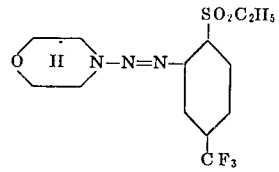

| I | II | III | IV |
|---|---|---|---|
| 1. 2,5-dichloroaniline | 2,3-hydroxynaphthoic acid | 4',4''-diamino-1,2,5-triphenyl-1,3,4-triazole | Red. |
| 2. 2,4,5-trichloroaniline | do | 4',4''-diamino-2,5-diphenyl-1,3,4-triazole | Brown. |
| 3. 2-chloro-5-trifluoromethylaniline | do | do | Red. |
| 4. 2-nitro-4-trifluoromethylaniline | do | do | Brown. |
| 5. do | do | 4',4''-diamino-3',3'''-dimethyl-2,5-diphenyl-1,3,4-triazole | Do. |

EXAMPLE 5

1.51 Parts of anthranilic acid methyl ester are diazotized with aqueous hydrochloric acid, ice and sodium nitrite in the customary manner.

4.05 Parts of 4'-(2''-hydroxy-3''-naphthoyl)-amino-2,5-diphenyl-1,3,4-triazole are dissolved cold in a mixture of 150 parts of ethanol, 50 parts of water and 3.0 parts of 30 percent sodium hydroxide solution. 1 Part of the condensation product of 8 mols of ethylene oxide and 1 mol of p-tert.-octylphenol is added to the solution and the naphthol is subsequently precipitated by means of acetic acid with good stirring. The product is coupled by adding the diazo solution described in paragraph 1 maintaining a pH value of 6.0 to 6.5 and a temperature of 15° to 20° C. To complete the coupling, the mixture is stirred for a further hour at the same temperature and then stirred for another hour at 70° to 80° C. The resulting pigment suspension is rendered acid to Congo Red by adding hydrochloric acid and filtered. The product is washed with hot water until chloride ions can no longer be detected in the filtrate. After drying at 80° to 90° C in vacuo, the orange pigment dyestuff of the formula

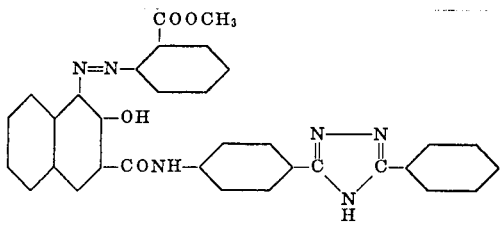

manufactured by coupling diazotized 3-amino-4-ethylsulphonyl-benzotrifluoride with morpholine in an alkaline medium, and 2.1 parts of 4'-(2'''-hydroxy-3'''-naphthoyl)-amino-4''-methyl-2,5-diphenyl-1,3,4-triazole are suspended in 130 parts of o-dichlorobenzene, heated to 120° to 125° C. and mixed with 6 parts of glacial acetic acid. The mixture is stirred for a further hour at 145° to 150° C., whereby the decomposition of the diazo-amino compound and the coupling to form the pigment are completed. The red pigment is filtered hot, and rinsed with hot o-dichlorobenzene, cold methanol and hot water. After drying in vacuo at 80° C., 2.1 parts of an orange monoazo dyestuff of the formula

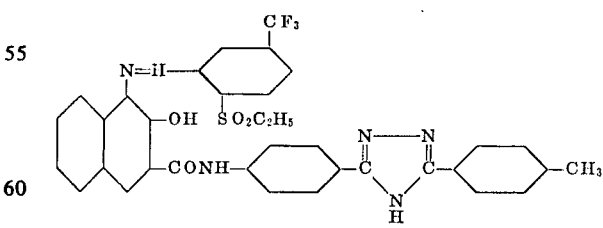

are obtained in a soft form. The dyestuff is sparingly soluble to insoluble in the customary solvents and dyes polyvinyl chloride film and lacquers orange shades having good fastness to migration, overstripe bleeding and light.

EXAMPLE 7

65 Parts of stabilized polyvinyl chloride, 35 parts of dioctyl phthalate and 0.2 part of the pigment obtained according to Example 1 are stirred with one another and milled for 7 minutes at 140° C. on a two-roll calender. A pure red-colored film of very good fastness to light and migration is obtained.

I claim:

1. An azo pigment of the formula

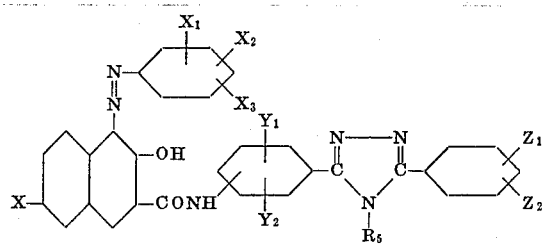

wherein $X_1$ denotes hydrogen, chloro, bromo or lower alkyl, $X_2$ and $X_3$ each denotes hydrogen, chloro, bromo, lower alkyl, lower alkoxy, phenoxy, nitro, cyano, carboxylic acid lower alkyl or phenyl ester, lower alkylsulphonyl, phenyl lower alkyl sulphonyl, trifluoromethyl, sulphonic acid phenyl amide, sulphonic acid lower alkyl or phenyl ester, or a group of the formula -CONHR-, in which R denotes hydrogen, lower alkyl, unsubstituted phenyl or phenyl substituted by chloro, lower alkyl, lower alkoxy, trifluoromethyl or lower carbalkoxy groups, X denotes hydrogen, bromo, lower alkoxy, nitro or cyano, $Y_1$ and $Y_2$ each denotes hydrogen, chloro or lower alkyl, $Z_1$ and $Z_2$ each denoted hydrogen, chloro, lower alkyl, lower alkoxy, trifluoromethyl or lower carbalkoxy, and $R_5$ denotes lower alkyl, phenyl or hydrogen.

2. An azo pigment as claimed in claim 1 of the formula

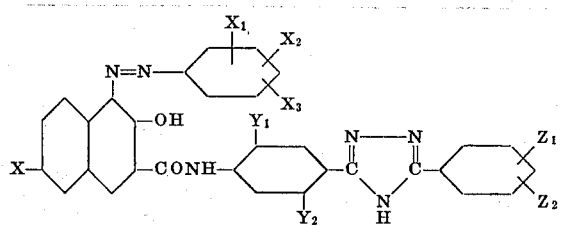

3. The compound as claimed in claim 1 of the formula

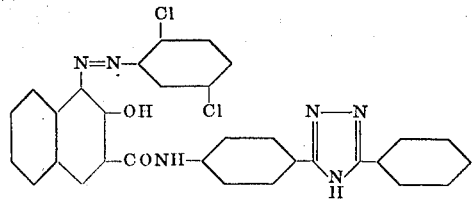

4. The compound as claimed in claim 1 of the formula

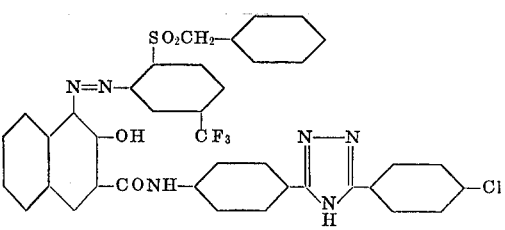

5. The compound as claimed in claim 1 of the formula

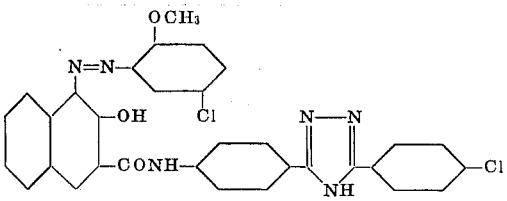

6. The compound as claimed in claim 1 of the formula

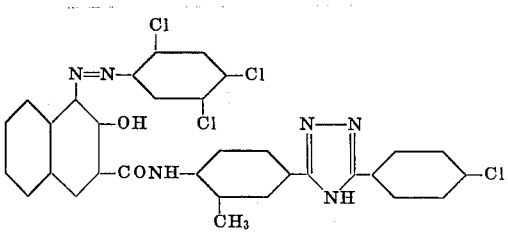

7. The compound as claimed in claim 1 of the formula

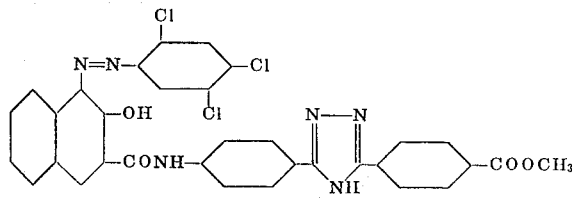

8. The compound as claimed in claim 1 of the formula

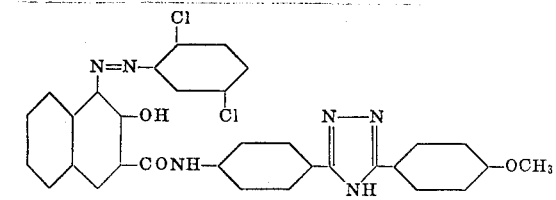

* * * * *